(12) United States Patent
Weyl

(10) Patent No.: US 11,422,548 B2
(45) Date of Patent: Aug. 23, 2022

(54) SYSTEM AND METHOD FOR ASSESSING AVAILABILITY AND RELIABILITY OF DISTRIBUTED ENERGY RESOURCES

(71) Applicant: Kitu Systems, Inc., San Diego, CA (US)

(72) Inventor: Vincent Weyl, San Diego, CA (US)

(73) Assignee: Kitu Systems, Inc., San Diego, CA (US)

( * ) Notice: Subject to any disclaimer, the term of this patent is extended or adjusted under 35 U.S.C. 154(b) by 50 days.

(21) Appl. No.: 16/828,002

(22) Filed: Mar. 24, 2020

(65) Prior Publication Data

US 2020/0310404 A1 Oct. 1, 2020

Related U.S. Application Data

(60) Provisional application No. 62/823,549, filed on Mar. 25, 2019.

(51) Int. Cl.
*G05B 23/02* (2006.01)
*G05B 19/048* (2006.01)
*H04L 67/12* (2022.01)

(52) U.S. Cl.
CPC ....... *G05B 23/0256* (2013.01); *G05B 19/048* (2013.01); *G05B 2219/2639* (2013.01); *H04L 67/12* (2013.01)

(58) Field of Classification Search
CPC .............. G05B 23/0256; G05B 19/048; G05B 2219/2639

USPC ........................................................ 700/292
See application file for complete search history.

(56) References Cited

U.S. PATENT DOCUMENTS

| | | | | |
|---|---|---|---|---|
| 2012/0101639 | A1* | 4/2012 | Carralero | G06F 1/26 700/286 |
| 2014/0018969 | A1* | 1/2014 | Forbes, Jr. | H02J 3/32 700/295 |
| 2014/0148960 | A1* | 5/2014 | Bhageria | H02J 13/00028 700/286 |
| 2019/0319450 | A1* | 10/2019 | Jung | H02J 9/00 |
| 2020/0156495 | A1* | 5/2020 | Lindup | H02J 7/0027 |

* cited by examiner

*Primary Examiner* — Jigneshkumar C Patel
(74) *Attorney, Agent, or Firm* — Cooley LLP

(57) ABSTRACT

A method of assessing the reliability and availability of a distributed energy resource (DER) device included among a plurality of DER devices in communication with a platform over a network. The method includes monitoring, by the platform, behavior of the DER device. This may include monitoring an extent to which the DER device is available to engage in communication with the platform over the network. This monitoring may also include determining whether the DER device acknowledges control commands sent to the DER device over the network and determining whether the DER executes the control commands in conformance with at least one of a standard and a regulation. The method further includes determining, based upon the monitoring of the behavior of the DER device, a value of a reliability and availability score for the DER device.

16 Claims, 17 Drawing Sheets

| Interval | Qualification |
|---|---|
| 0 to 299 | FAIL: no communication capability |
| 300 to 399 | BASIC: the device is communication capable (as defined in CA Rule 21) |
| 400 to 649 | FAIR: device generally operates with fair reliability, availability and capability |
| 650 to 729 | GOOD: device is operating with good reliability, availability and capability |
| 730 to 799 | EXCELLENT: device is operating with high reliability, availability and capability |
| 800 to 850 | OPTIMAL: device has been1 operating with near perfect reliability, availability and capability |

FIG. 3A

| | |
|---|---|
| <300 | No communication capability (FAILED)<br>Device unable to establish a secure communication link for grid support functions |
| 300+ | Basic availability and reliability (BASIC) |
| 400+ | Fair availability and reliability (can be reached within 1 month of installation) (FAIR) |
| 500+ | Good availability and reliability (GOOD) |
| 700+ | Very Good (EXCELLENT) |
| 800+ | Excellent (OPTIMAL) |

Minimum score: 0
Maximum score: 850
Initial score: 0 (fail) or 300 (first pass)

FIG. 3B

| CONVOY | Login   Sign Up |
| --- | --- |
| KITU SCORE CALCULATOR | |

Sponsored by SPONSOR BRAND

Your Kitu Score

SFDI #111122223456

------ ---- ------ @ 2013

------ ---- ------

775

Advanced Communication Capability
Device is capable of maintaining permanent connection, communicating data and reacting to control with less than 10% downtime Failed ............................. Excellent ☑ Device Nameplate   ☑ Device Metrology   ☑ Device Controls

[🖨 Print Results] [⬇ Download]

← Look up another Device Identifier

How Do I Improve My Kitu Score?

The Kitu Score accesses the capability of a distributed energy resource to interact and coordinate with grid management systems and to perform grid support function to increase your kitu score, make sure you use an approved Smart Inverter

FIG. 6

CONNECTIVITY

| Step | Timing | Device | DER Service Platform | Description | Impact on Kitu Score |
|---|---|---|---|---|---|
| | When device first connects to Convoy | | Device Establishes a TLS Connection | | A successful connection with the server must be established for the device to be scored. Device must then be registered or 'claimed' by owner on the portal using device identifier to visualize score results |
| 1 | | TLS Handshake and Certificate Exchange -> | <- TLS Handshake and Certificate Exchange | The device initiates a successful TLS handshake with convoy using the IEEE 2030.5 cipher suite | Basic requirement: failure or time out at this stage results in initial non-compliance or critical negative impact on kitu Score |
| 2 | | | Convoy calculates the device LFDI and SFDI from the client certificate | | This device identifier is used by DER owner or installer to 'claim' the device in the Convoy DER portal, allowing them to visualize score and/or detailed test results. This assumes that DER owner has a way to locate this device ID on the device itself or from a service provider |

FIG. 7

| METROLOGY - METER DATA | | | | | |
|---|---|---|---|---|---|
| Step | Timing | Device | Convoy | Description | Impact on Kitu Score |
| 6 | | | <- GET Mirror usage Point Response | Convoy responds with the mirror Usage Point resource which contains the Mirror Meter Reading List Link URL | |
| 7 | | POST Mirror Meter Reading Request List Link -> | | The device creates a Mirror Meter Reading resource for a single meter data type | Basic requirement: failure or time out at this stage results in initial non-compliance or critical negative impact on Kitu Score |
| 8 | | | <- POST Mirror Meter Reading list link Response | Convoy responds with the URL of created Mirror Meter Reading resource | |
| 9 | | GET Mirror Meter Reading Request -> | | The device reads the created Mirror Meter Reading resource | Basic requirement: failure or time out at this stage results in initial non-compliance or critical negative impact on Kitu Score |
| 10 | | | <- GET Mirror Meter Reading Response | Convoy responds with the Mirror Meter Reading resource which contains the Reading Type and Reading URLs | |
| 11 | | POST Reading Type Request -> | | The device creates a Reading Type resource that contains the attributes of the meter data type | Basic requirement: failure or time out at this stage results in initial non-compliance or critical negative impact on Kitu Score |
| 12 | | | <- POST Reading Response | Convoy responds with success | |
| 13 | | Repeat from step11 for each meter data type | | Steps are repeated for each meter data type that the device will send | |

FIG. 8

| | Periodically at post rate set by Convoy in step 8 | Device Periodically Sends Metrology Data | Basic requirement: failure or time out at this stage results in negative impact on Kitu Score |
|---|---|---|---|
| 14 | POST Reading Request -> | The device sends a single meter data value | Basic requirement: failure or time out at this stage results in negative impact on Kitu Score |
| 15 | <- POST Reading Response | Convoy responds with success | |
| 16 | *Repeat from step14 for each meter data type* | Steps are repeated for each meter data type that the device will send | |
| | Every 15 minutes | Convoy Verifies Device Meter Data | Basic requirement: failure or time out at this stage results in negative impact on Kitu Score |
| | | Convoy verifies that a new Reading resource has been POSTed by the device for following CSIP required meter data types:<br>- Active power<br>- Reactive power<br>- Frequency<br>- Voltage | Convoy checks for missing POSTs for any of the required meter data types |

FIG. 8 (Cont.)

METROLOGY - DER INFO

| Step | Timing | Device | Convoy | Description | Impact on Kitu Score |
|---|---|---|---|---|---|
| | When device first connects to Convoy | | Device Locates URLs To Store DER Info | | A successful connection with the server must be established for the device to be scored. Device must then be registered or 'claimed' by owner on the portal Using device identifier to Visualize score results |
| 1 | | GET Device Capability Request -> | | The device does a GET to the pre-provisioned Device Capability URL | Basic requirement: failure or time out at this stage results in initial non-compliance or critical negative impact on Kitu Score |
| 2 | | | <- GET Device Capability Response | Convoy responds with the Device Capability resource which contains the End Device List Link URL | |
| 3 | | GET End Device List Link Request -> | | The device reads the End Device list | Basic requirement: failure or time out at this stage results in initial non-compliance or critical negative impact on Kitu Score |
| 4 | | | <- GET End Device List Link Response | Convoy responds with the EndDevice resource of the device, which contains the DER List Link URL | |
| 5 | | GET DER List Link Response -> | | The device reads the DER list | Basic requirement: failure or time out at this stage results in initial non-compliance or critical negative impact on Kitu Score |
| 6 | | | <- GET DER List Link Response | Convoy responds with the DER list which contains a DER resource, which contains the DER Capability Link URL and DER settings Link URL | |
| 7 | | POST DER Capability Link Request -> | | The device creates a DER Capability resource | Basic requirement: failure or time out at this stage results in initial non-compliance or critical negative impact on Kitu Score |

FIG. 9

| | | | |
|---|---|---|---|
| 8 | | <- POST DER Capability Link Request | Convoy responds with success.<br><br>Convoy verifies that the following CSIP required nameplate values have been POSTed by the device:<br>- Maximum rate of energy transfer received<br>- Maximum rate of energy transfer delivered<br>- Maximum apparent power<br>- Maximum reactive power delivered<br>- Maximum reactive power received<br>- Maximum active power<br>- Minimum power factor displacement | Convoy checks for missing POSTs for any of the required nameplate data |
| 9 | POST DER Settings Link Request -> | | The device creates a DER Settings resource | Basic requirement: failure or time out at this stage results in initial non-compliance or critical negative impact on Kitu Score |
| 10 | | <- POST DER Settings Link Request | Convoy responds with success.<br><br>Convoy verifies that the following CSIP required settings values have been POSTed by the device:<br>- Maximum rate of energy transfer received<br>- Maximum rate of energy transfer delivered<br>- Maximum apparent power<br>- Maximum reactive power delivered<br>- Maximum reactive power received<br>- Maximum active power<br>- Minimum power factor displacement | Convoy checks for missing POSTs for any of the required nameplate data |

FIG. 9 (Cont.)

CONTROLS

| Step | Timing | Device | Convoy | Description | Impact on Kitu Score |
|---|---|---|---|---|---|
| | When device first connects to Convoy | | Device Locates DER Control list | Assumption: the device can be configured to communicate with the server (URL) | A successful connection with the server must be established for the device to be scored. Device must then be registered or 'Claimed' by owner on the portal using device identifier to visualize score results |
| 1 | | GET Device Capability Request -> | | The device does a GET to the pre-provisioned Device Capability URL | Basic requirement: failure or time out at this stage results in initial non-compliance or critical negative impact on Kitu Score |
| 2 | | | <- GET Device Capability Response | Convoy responds with the Device Capability resource which contains the End Device List Link URL | |
| 3 | | GET End Device List Link Request -> | | The device reads the End Device List | Basic requirement: failure or time out at this stage results in initial non-compliance or critical negative impact on Kitu Score |
| 4 | | | <- GET End Device List Link Response | Convoy responds with the End Device resource of the device, which contains the Function Set Assignments List Link URL | |
| 5 | | GET Function Set Assignments List Link Request -> | | The device reads the Function Set Assignments List | Basic requirement: failure or time out at this stage results in initial non-compliance or critical negative impact on Kitu Score |
| 6 | | | <- GET Function Set Assignments List Link Response | Convoy responds with the Function Set Assignments List which contains the DER Program List Link URL | |
| 7 | | GET DER Program List Link Request -> | | The device reads the Function Set Assignments List | Basic requirement: failure or time out at this stage results in initial non-compliance or critical negative impact on Kitu Score |
| 8 | | | <- GET DER Program List Link Response | Convoy responds with the DER Program list which contains a DER Program resource, which contains a DER Control List Link URL. The DER Program resource will have a poll rate set to 15 minutes. | |

FIG. 10

| | | Convoy verifies Control Behaviour | | |
|---|---|---|---|---|
| Every 15 minutes | | | | Basic requirement failure or time out at this stage results in negative impact on Kitu Score |
| 9 | | Convoy creates a DERControl event for the device | The DER Control has a start time and duration that completes within the 15 minute interval. The response Required and reply To attributes in the DER Control indicate that the device must sent responses when the control is received, started, and | |
| 10 | GET DER Control List Link Request -> | | The device periodically reads the DER Control list at the poll rate set in step 8 | Basic requirement failure or time out at this stage results in negative impact on Kitu Score |
| 11 | <- GET DER Control List Link Response | | Convoy responds with the DER Control list Which contains the DER Control resource created in step 9 | |
| 12 | POST Response(received) request -> | | The device sends an event received response | Basic requirement failure or time out at this stage results in negative impact on Kitu Score |
| 13 | <- Post Response Response | | Convoy responds with success | |
| 14 | At the start time of the DER Control | POST Response(started) request -> | The device sends an event received response | Basic requirement failure or time out at this stage results in negative impact on Kitu Score |
| 15 | <- Post Response Response | | Convoy responds with success | |
| 16 | At the start time of the DER Control | POST Response(completed) request -> | The device sends an event completed response | Basic requirement failure or time out at this stage results in negative impact on Kitu Score |
| 17 | <- Post Response Response | | Convoy responds with success | |
| 18 | | Convoy evaluates received meter data and calculates device performance | | Advanced requirement: Kitu will monitor device behavior and metrology and verify if it stays within operating range defined by the controls. And deviation/violation from prescribed behavior results in a negative impact on Kitu Score |

FIG. 10 (Cont.)

SYSTEM AND METHOD FOR ASSESSING AVAILABILITY AND RELIABILITY OF DISTRIBUTED ENERGY RESOURCES

CROSS-REFERENCE TO RELATED APPLICATIONS

This application claims priority to and the benefit of U.S. Provisional Patent Application No. 62/823,549, entitled SYSTEM AND METHOD FOR ASSESSING AVAILABILITY AND RELIABILITY OF DISTRIBUTED ENERGY RESOURCES, filed on Mar. 25, 2019, the disclosure of which is incorporated herein by reference in its entirety for all purposes.

FIELD

This disclosure relates generally to distributed energy resources on an electrical power grid and, more particularly, to monitoring and assessing such resources.

BACKGROUND

The growing adoption of renewable energy sources such as photovoltaic solar panels, stationary energy storage or electric vehicles present a challenge to the electrical grid, which was not designed to support bi-directional power flows. Current penetration levels already force utilities and independent system operators to adjust to what is known as the Duck Curve in California, or the Nessie Curve in Hawaii. Further penetration may endanger the stability of the entire grid, causing voltage or frequency issues, outages or even equipment damage.

Among the strategies designed to mitigate those risks is the ability for utilities to control distributed energy resources located behind-the-meter and coordinate their actions to provide grid-support services when needed. Example of grid-support services include voltage support, frequency regulation or reactive power injection or absorption. This approach also offers additional benefits, such as deferring or eliminating distribution upgrades or other utility-scale investments (large storage or solar power plants).

At the same time distributed energy resources have brought about a new industry, rich in jobs, innovative business models, value to end users and societal benefits such as greenhouse gas reduction. It is therefore in the interest of many stakeholders, not just end-users and grid operators to enable continued safe deployment and operation of DERs on the grid.

A key enabler of this coordination at scale is the communication infrastructure, and the capability of user devices and utility or third party systems to reliably and securely exchange information in both directions: the grid operator needs to collect the metrology data to better assess the status of the network on a local basis and the device needs to receive instructions to adjust its behavior based on grid conditions.

Real-time control at the scale of millions of devices connected over unreliable connection pathways (e.g. broadband internet access, cellular) is not practical, and cannot currently or in the foreseeable future be achieved at a reasonable cost.

Utilities and industry stakeholders worked together to design and improve the IEEE 2030.5 communication protocol which introduces the concept of curves and the capability of programming autonomous behaviors into distributed energy resources, enabling them to rapidly respond to energy parameters even if there is no or poor communication.

In California, investor-owned utilities collaboratively authored a Common Smart Invert Profile (CSIP) Implementation Guideline in an effort to standardize smart inverters deployed in the state. From a communication perspective, the CSIP guide distinguished three options:
  i. Direct communication between smart inverter and utility, using IEEE 2030.5
  ii. Communication through a GFEMS (Generating Facility Energy Management System); the interface between GFEMS and smart inverter is open, the GFEMS uses IEEE 2030.5 to communicate with the utility
  iii. Communication through an aggregator, where the connection between the smart inverters and aggregators can be IEEE 2030.5 or any alternative communication protocol, including proprietary, and the connection between aggregator and utility shall be IEEE 2030.5

Given the multiple available options and the reliance on general purpose communication networks, utilities are concerned a very large percentage of distributed energy resources would not be available at any given point in time to be called on to perform critical grid-support functions, even with the use of IEEE 2030.5 curves.

Limited-scale pilots have demonstrated the technical capability and benefits of smart inverter coordination: for the most part, smart inverters did behave as instructed. The pilots also outlined the difficulty to communicate with different hardware platforms, over different communication networks, and through aggregators: many communication outages occurred resulting in loss of data and inability to send controls.

Without improved visibility and predictability of behind-the-meter distributed energy resource behaviors, grid operators cannot and will not rely on DERs for distribution planning and other grid-support functions.

The other key stakeholders in the conversation about DER coordination are DER owners, installers, and manufacturers. While DER owners are vastly unaware of the issue and simply expect to continue buying ever cheaper energy resources, installers and manufacturers have been reluctant to enable communications. They currently see this as a set of requirements, making the deployment of DERs more complex and more expensive: devices need new capabilities and the interconnection process will involve additional steps by installers.

In order to gain broader support, the concept of coordination at scale of customer resources to build a safer, more reliable, more cost-effective grid needs to translate into value (not cost) created for DER owners and installers. Only with the right level of incentives will installers perform the additional tasks, and owners invest in the equipment and communication infrastructure, to enable grid-support functions.

SUMMARY

The disclosure is generally directed to a system and method for attributing a value to a DER based on its availability for external communication and ability to perform certain functions, such as grid-support functions. This value of DER availability and reliability may be referred to herein as the "Kitu Score". The system provides information to interested stakeholders about the benefits of orchestrated DERs in a way that delivers immediate value, and which may provide incentives for further investment in communication infrastructure so as to enable grid-support functions.

The Kitu Score provides an easy way for end users, not knowledgeable about smart inverter functionality or communication protocols, to monitor how well their devices perform, which will ultimately tie to higher rewards from energy tariffs and other utility incentives.

In one implementation the Kitu Score assesses the compliance of DER devices with interconnection and communication standards requirements such as (Rule 21 and CSIP), provides proof of a device's communication capability and over time provides an indication about the device's availability, reliability, and value to perform grid-services. Utilities can quickly identify which device they can rely on to optimize the distribution infrastructure.

As the Kitu Score correlates with DER benefits, there is strong incentive to keep it as high as possible, meaning ensuring devices operate and communicate properly at all times. This results in a new service opportunity for DER installers who can proactively monitor their customers' score and quickly react to detected issues.

The Kitu Score is designed to maximize ease of use by both end-users and installers. For example, initial assessment of communication capability does not require user/installer registration. Obtaining the initial score is easy and only requires two steps (configuring the device and entering the device identifier and ZIP code on a web portal). In addition, installers and end-users are invited to register to the service to monitor and increase their score—only the devices that are monitored over time can achieve higher scores.

In one exemplary implementation, the Kitu score may be determined by an application hosted by a cloud-based service platform operative to provide communication aggregation and other services for distributed energy resources (DERs). The DER service platform enables coordination at scale of DERs on the grid and allows grid operators to easily collect metrology data and dispatch DER controls to devices located at customer premises, 'behind the meter'. Alternatively, the Kitu Score may determine by an application operated in standalone mode or by an application integrated with third party platforms such as, for example, utility management systems or other DER aggregators.

The Kitu Score is a simple and easy way to provide a rapid assessment of a DER availability, reliability and value for grid support services. The more reliable, available and valuable a resource is, the higher its score will be, which will translate into higher benefits for both the grid operator and the DER owner.

This assessment may be achieved in the manner described in further detail herein. For example, in one aspect the disclosure is directed to a method of assessing the reliability and availability of a distributed energy resource (DER) device included among a plurality of DER devices in communication with a platform over a network. The method includes monitoring, by the platform, behavior of the DER device. This may include monitoring an extent to which the DER device is available to engage in communication with the platform over the network. This monitoring may also include determining whether the DER device acknowledges control commands sent to the DER device over the network and determining whether the DER executes the control commands in conformance with at least one of a standard and a regulation. The method further includes determining, based upon the monitoring of the behavior of the DER device, a value of a reliability and availability score, such as a Kitu Score, for the DER device.

The disclosed method may further include determining an updated value of the reliability and availability score based upon subsequent monitoring of the behavior of the DER device. The monitoring may also include determining whether the DER device regularly sends, over the network, metrology data collected by DER device wherein the metrology data includes measurement data relating to operation of the DER device.

In a further aspect the method includes detecting an incident involving the DER device wherein the incident relates to failure of the DER device to operate in accordance with expected operating parameters and determining an updated value of the reliability and availability score based upon the incident. The incident may relate to at least one of: a loss of a network connection with the DER device, a failure by the DER device to report data, a failure by the DER device to respond to one or more additional control commands sent to the DER device, reporting by the DER device of behavior of the DER device outside of a normal operating range. The incident may also be of a duration and a frequency over a measurement period wherein the updated value of the reliability and availability score is based at least in part upon the duration and the frequency. The incident may further be of a severity wherein the updated value of the reliability and availability score is based at least in part upon the severity of the incident.

The method may further include determining an initial value of the reliability and availability score for the DER device based upon whether the DER device is determined to be compliant with interconnection requirements.

The disclosure is further directed to a distributed energy resource (DER) service platform including a DER management server in communication with a plurality of DER devices over a network. The DER management server includes one or more processors and code executable by the one or more processors for monitoring behavior of a DER device included among the plurality of DER devices. The code for monitoring the behavior of the DER device includes code for monitoring an extent to which the DER device is available to engage in communication with the DER management server. The code for behavior monitoring further includes code for determining whether the DER device acknowledges control commands sent to the DER device over the network and for determining whether the DER executes the control commands in conformance with at least one of a standard and a regulation. The DER service platform further includes a DER database including monitoring information concerning results of the monitoring the behavior of the DER device. A DER device scoring engine includes at least one processor and code executable by the processor for calculating a value of a reliability and availability score for the DER device based upon the monitoring information.

BRIEF DESCRIPTION OF THE FIGURES

The invention is more fully appreciated in connection with the following detailed description taken in conjunction with the accompanying drawings, in which:

FIGS. 3A and 3B illustrate alternate tables describing intermediate levels and thresholds for exemplary Kitu Score assessments.

FIG. 6 is a screenshot of an exemplary user interface for a Kitu Score results page displayed upon completing evaluation of a DER under consideration.

FIGS. 7-10 are flow diagrams illustrating a set of exemplary tests that could be executed to assess DER performance and availability in accordance with the disclosure.

Like reference numerals refer to corresponding parts throughout the several views of the drawings.

DETAILED DESCRIPTION

The disclosure pertains to a system and method for measuring the reliability and availability of a distributed energy resource device with respect to (i) communication with grid management systems using standard communication protocols and (ii) performing grid-support functions and other energy services. The system may be implemented using "cloud" computing capabilities and may be integrated within a DER service platform. Alternatively, embodiments of the disclosed system may be implemented using dedicated server infrastructure.

System Overview

Figure 1A:
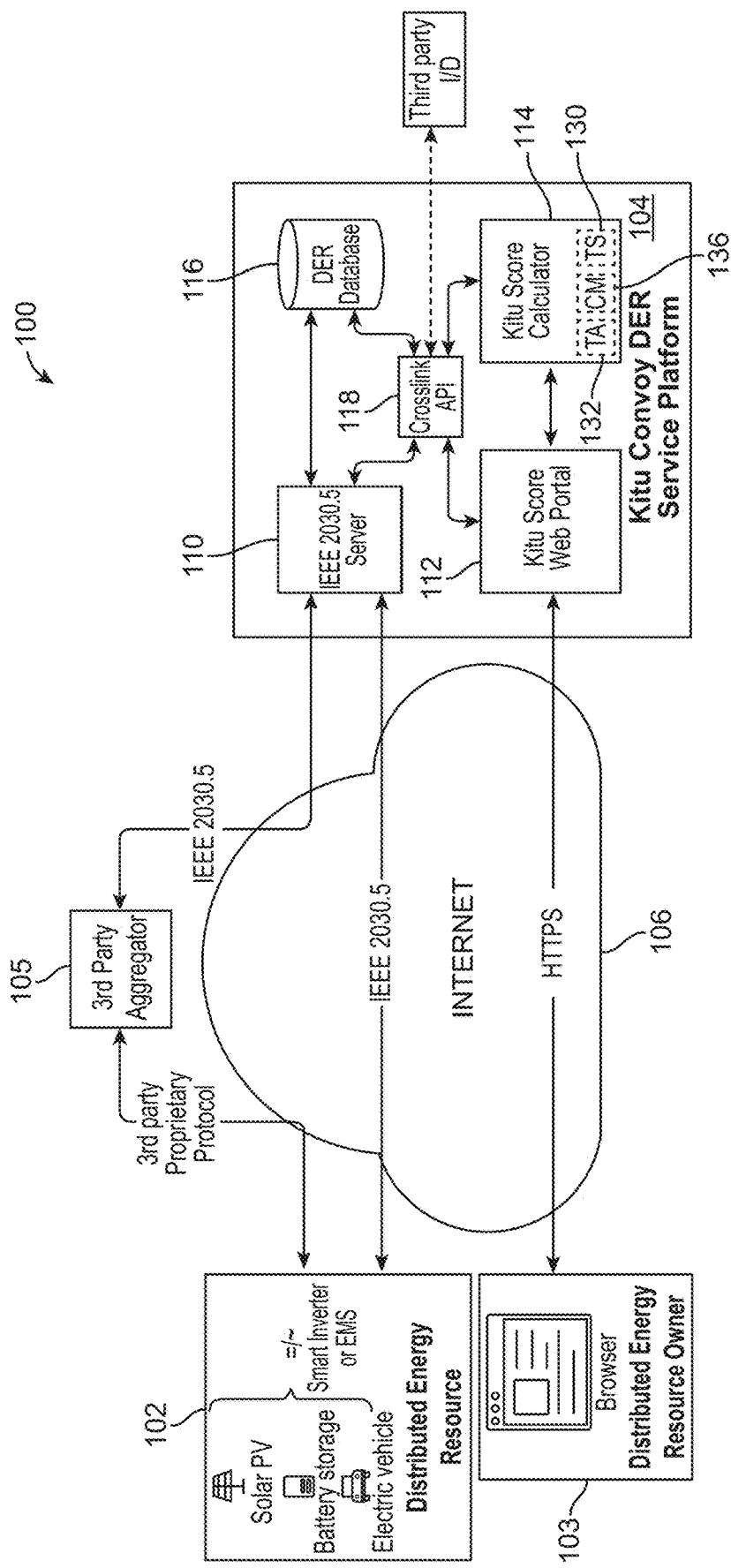
FIGS. 1A and 1B illustrate systems configured to measure the reliability and availability of a distributed energy resource device in accordance with an embodiment.

FIG. 1A illustrates a system 100 configured to measure the reliability and availability of a distributed energy resource device in accordance with an embodiment. The system 100 includes at least one distributed energy resource (DER) device 102, a client device 103 of an owner of the DER device 102, a DER service platform 104 and a 3rd part aggregator server 105, all of which may be connected via a network 106, which may be any wired or wireless network and will generally include the Internet. As shown, the DER service platform 104 includes an IEEE 2030.5 server 110, a Kitu Score Web portal 112, a Kitu Score calculator module 114 and a DER database 116. The platform 104 may also be referred to herein and within the drawings as "Convoy", the "Convoy DER Service Platform", or the like.

Figure 2:
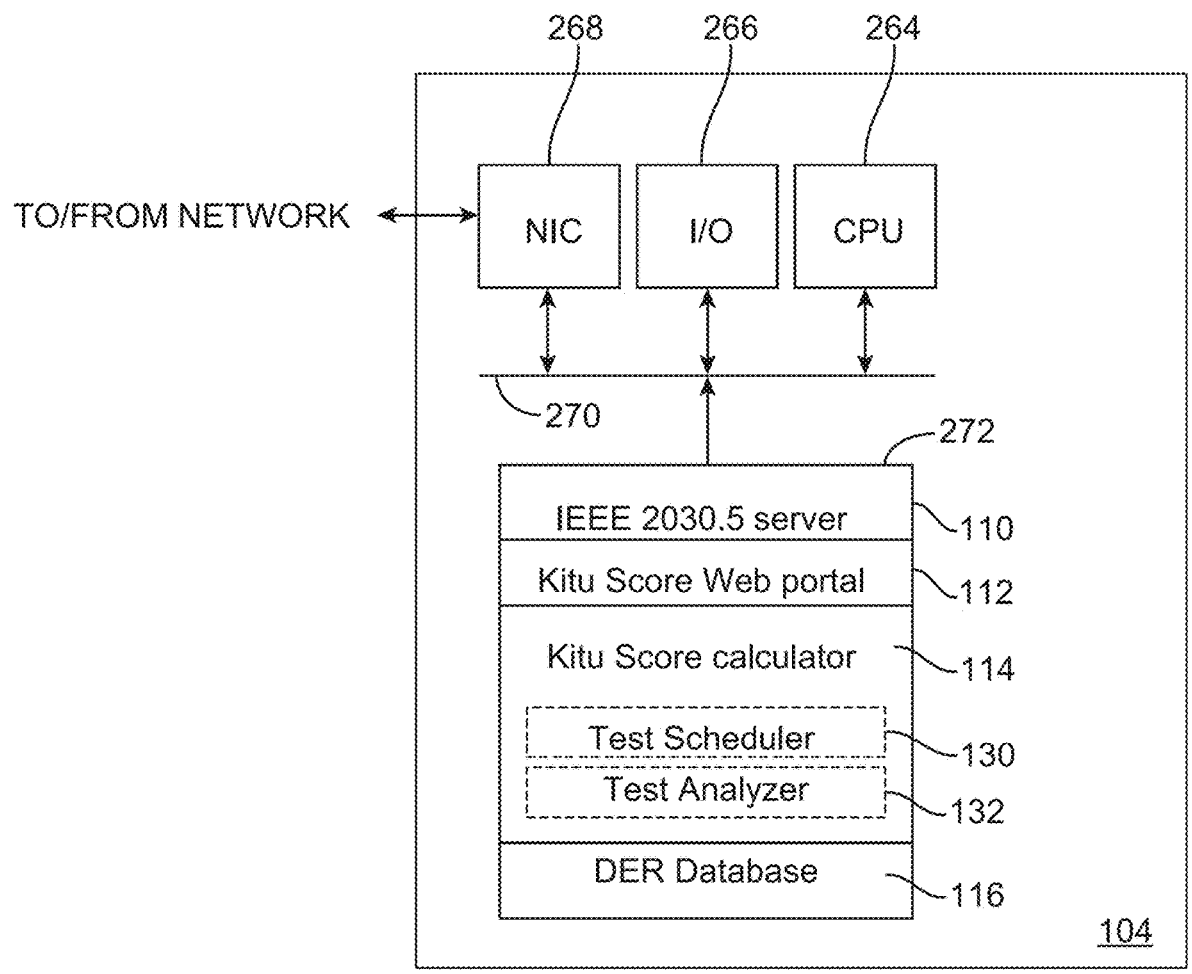
FIG. 2 is a block diagram providing additional detail of an exemplary implementation of the DER service platform.

FIG. 2 is a block diagram providing additional detail of an exemplary implementation of the DER service platform 104. As shown, the DER service platform 104 includes standard components, such as a central processing unit 264, input/output devices 266 and one or more network interface circuits 268 in communication over a bus 270. A memory 272 is also connected to the bus 270. The memory 272 stores executable instructions to implement the IEEE 2030.5 server 110, the Kitu Score Web portal 112, and the Kitu Score calculator module 114, and the DER database 116. Exemplary scoring methodologies implemented by the Kitu Score calculator module 114 based upon information provided by one or more of the IEEE 2030.5 server 110, the Kitu Score Web portal 112, and the DER database 116 are described below.

In one embodiment the Kitu Score calculator module 114 and the Kitu Score Web portal 112 (which may be collectively referred to as the Kitu Score application) allow score calculations from internal data (i.e., data collected from connected devices or aggregators) and external sources (through the Crosslink API 118).

The Crosslink API 118 is a family of application programming interfaces that enables communication between internal services provided by the platform 104 and other applications. In one embodiment the Crosslink API 118 is a Web service RESTful API and uses the JSON data format. The Crosslink API may include a Crosslink Score API configured to provide UI elements to collect user data and display score results, data inputs to compute a score, and a score output and detailed results (including anomalies).

As is discussed below, the DER service platform 104 may be configured to monitor the behavior of the DER device 102 and compliance of the device 102 with grid interconnection requirements in order to assess the available and reliability of the device. This monitoring may include, for example, monitoring as to whether the device 102 is online and regularly and reliably sends the metrology data required by applicable standards or regulations. This device monitoring process may further include determining whether the device 102 acknowledges and executes controls.

In one embodiment each device 102 is attributed is attributed a score within a predefined range (e.g., between 0 and 850) based on its availability and reliability as determined through this device monitoring process. For example, if at the time of connection of a device 102 it is compliant with the interconnection requirement, then the device is granted an initial score of 300. This score is then adjusted over time based upon whether the device 102 exhibits continuous operation, performance and compliance. In one embodiment a punctual or extended failure to perform on the part of the device 102 results in penalties which decrease the score.

Figure 1B:
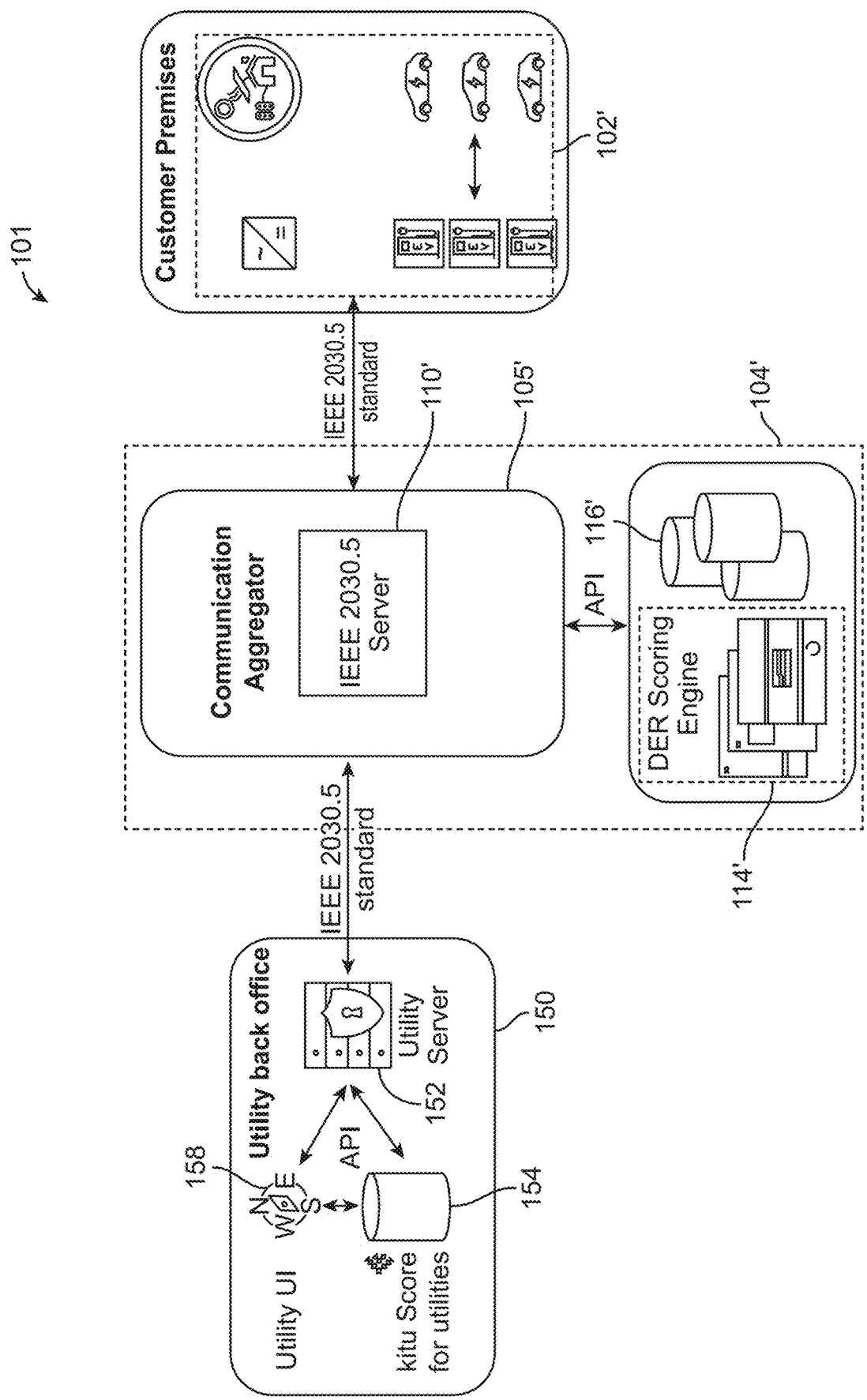

FIG. 1B illustrates a system 101 which is also configured to measure the reliability and availability of a DER device 102'. The elements of system 101 are configured substantially similarly or identically to the elements of system 100. However, in the system 101 a utility back office 150 may also communication with DER devices 102' through a communication aggregator 105' including an IEEE 2030.5 server 110'. The utility back office 150 may include a utility server 152 configured to interface with a Kitu Score calculator module 114' via the communication aggregator 105'. The utility server 152 may provide score information generated by the calculator module 114' to a score database 154 accessible by a utility portal 158.

Referring again to FIGS. 1A, 1B and 2, in an exemplary embodiment the IEEE 2030.5 server 110 is configured to perform a number of functions and operations in connection with interfacing with DER devices 102 and aggregators 105. For example, the server 110 may terminate communications and enforce access control (certificate validity, device whitelist, blacklist) with respect to DER devices 102 and/or aggregators 105. The server 110 may be further configured to collect device data (device info, metrology, event responses) and store the collected data in DER database 116. In addition, the server 110 may send controls to DER devices 102 and log events and anomalies (e.g., DER connection status). Controls may be in the form of, for example, an instruction, set of instructions or a behavior (e.g., a curve). Such controls sent by the server 110 for testing purposes during a test period may be referred to herein as "test controls" or "tests".

The Kitu Score Portal 112 generates a graphical user interface API for Kitu Score. In one embodiment it consists of a set of UI elements that can be displayed in a Web browser or mobile application. These UI elements may include, for example, a device query form (through which users enter device information to retrieve a score), a device/user registration form, and both simplified and detailed test results.

In exemplary embodiments the score calculator module 114 is the principal engine behind determination of the Kitu Score. The module 114 includes a test scheduler 130 configured to run and/or schedule tests of the DER device 102 under evaluation. The module may further include a test analyzer 132 configured to analyze and detect anomalies arising during such tests, compute scores and notify users of test results.

Test Scheduler

The test scheduler 130 enables Kitu Score evaluations to be requested manually by end users (on-demand) or automatically by the platform 104. For a non-registered DER device 102, the initial on-demand test is conducted with the initial evaluation of capability tests described herein.

For a registered DER device 102, the on-demand test will provide, as a score, the score last calculated by the platform 104, with the detailed results section showing the current actual device metrology data and the previous assessment details (e.g. received×interval data measurements, y event responses, operated within specified/default control ranges). In one embodiment no additional control is sent.

A representative sample of the type of metrology data that could be provided by a DER device 102 in the form of an electric vehicle (EV) charging station over a particular testing interval is provided below:

Accumulated Energy over interval
Accumulated Energy over lifetime
Total energy for last charge session reported by AV
Average power over interval
Max power over interval
Min power over interval
Average voltage over interval
Max voltage over interval
Min voltage over interval
Average current over interval
Max current over interval
Min current over interval
Average frequency over interval
Max frequency over interval
Min frequency over interval
Average temp over interval
Max temp over interval
Min temp over interval
Most recent instantaneous Wi-Fi power In one embodiment score assessment is performed on each connected DER device 102 on a regular basis. If a DER device 102' is connected to a utility back office 150 for DER coordination purposes, the platform 104' does not send test controls, but monitors utility-defined controls if any. If a DER device 102 is not connected to a utility, then the default test control is run by the platform 104.

Test Analyzer

The test analyzer 132 parses the results of test controls sent to a DER device 102. Such results may be referred to herein as "test results". In one embodiment the test controls are intended to verify aspects of device conformance and device performance. In this regard conformance means sending, in the appropriate format, the correct protocol messages, datapoints, and acknowledgements as defined per standard and/or regulation (e.g. utility interconnection requirements). Performance refers to measuring the outputs of the DER device 102 and verifying these outputs are within the defined/expected operating boundaries.

In one embodiment a DER device 102 under test may be instructed to perform an initial test to assess the posting capability of device 102. Specifically, the initial test may include verifying that the device 102 posts the required information to the applicable URIs per CSIP guidelines (e.g. Nameplate Rating, Adjusted Settings, Operational Status Information). The initial test also may also include (i) verifying that the device 102 posts its metrology data and that the received data is consistent with the operational status and/or default controls, and (ii) verifying that the device sends a response to a test DERControl module of the DER service platform 104.

Note that additional information on the communication path (such as IP address or latency) are provided (and in some cases analyzed) and may have an incidence on the score calculation.

For registered devices and ongoing Kitu Score evaluation, in one embodiment the test analyzer 132 performs the following tasks: (i) verify that all the metrology data in 15 minutes interval or interval size defined by the utility if applicable has been received; (ii) verify that response(s) have been received for the test control or controls defined by the utilities (or other allowed entities) if applicable; (iii) verify that the device metrology data shows operation conditions in line with the default or specific controls in effect; (iv) flag any anomaly if applicable.

Computing Module

The computing module 136 of the Kitu score calculator 114 receives test results from the test analyzer 132 and uses the score calculation rules outlined herein to evaluate the new Kitu Score of the DER device under evaluation 102. In one embodiment each new calculated value of the Kitu Score is stored in the DER database 116 with its timestamp.

In one embodiment an API of the Kitu score calculator 114 will have the ability to output the following information: (i) score value and trend; (ii) anomaly (date, nature, severity and description of the problem); and (iii) score change (date, value and reason of score change).

Kitu Score Definition

As previously mentioned, the Kitu Score provides an indication of the reliability and availability of a DER device 102 to communicate with grid management systems using standard communication protocols and to perform grid-support functions and other energy services.

Attention is now directed to FIGS. 3A and 3B, which include tables illustrating exemplary intermediate levels and thresholds associated with one implementation of a scale for the Kitu Score. As shown, in the implementation of FIGS. 3A and 3B the Kitu Score ranges from 0 (no communication) to 850 (optimal availability and reliability).

In one embodiment the initial value of the Kitu Score is calculated the first time the DER device 102 is connected. The initial score determines the compliance of the device 102 with the communication and capability requirements, and is based on the following initial tests: (i) Can the device establish secure two-way communications? (ii) Does the device post the required metrology data? (iii) Does the device respond to control requests? Failure to pass these tests will result in a score of 0. In one implementation the capabilities tested are all required for device certification, meaning no certified device in the field should fail these tests unless an issue occurs on the communication pathway.

Successful completion of the above initial tests will result in an initial score of 300. In one embodiment the first successful test for a device 102, even after a string of failures, will bump its score to 300.

Once the initial Kitu Score is established, the device 102 is subject to ongoing evaluation during its operation. This operation may be in an environment in which the device 102 is connected only to the DER service platform 104 or is instead also connected to either a utility 150 or a third-party service provider 105. If the device is only connected to the DER service platform 104, then in one embodiment the initial evaluation tests are repeated every 15 minutes. If the device 102 is connected to a utility 150, the rate at which metrology data is communicated is determined by the utility 150. The DER platform 104 will monitor response to controls defined by a utility 150 or third-party 105 and may continue to run test controls. In this case, the platform 104 will look for both failure-to-respond and failure-to-comply.

The Kitu Score may be regarded as an indication of trustworthiness; that is, trust is hard to gain, easy to lose. Accordingly, in one implementation the Kitu Score will slowly increase over a period of time, provided the device 102 has not failed an evaluation. The score will decrease every time an incident or failure is detected by an amount related to the severity of the incident.

The Kitu Score will increase by a few base points for every week where no incident is detected. For every consecutive calendar month without incident, bonus points are also awarded.

The goal is to allow a device to reach the maximum score within a year of operation.

As an example, the Kitu Score may progress over time as follows:

$$Kn = K0 + 550 \times \left(1 - e^{-\frac{n}{120} \times (1-\Delta)}\right)$$

where:

$K_n$ is the score calculated after the $n^{th}$ observation period (here a period is a day);

$K_0$ is the initial score (for a device successfully interconnected, $K_0$=300);

$\Delta$ represents a penalty applied on the score (expressed as 'going back a certain amount of time on the curve').

Figure 12:
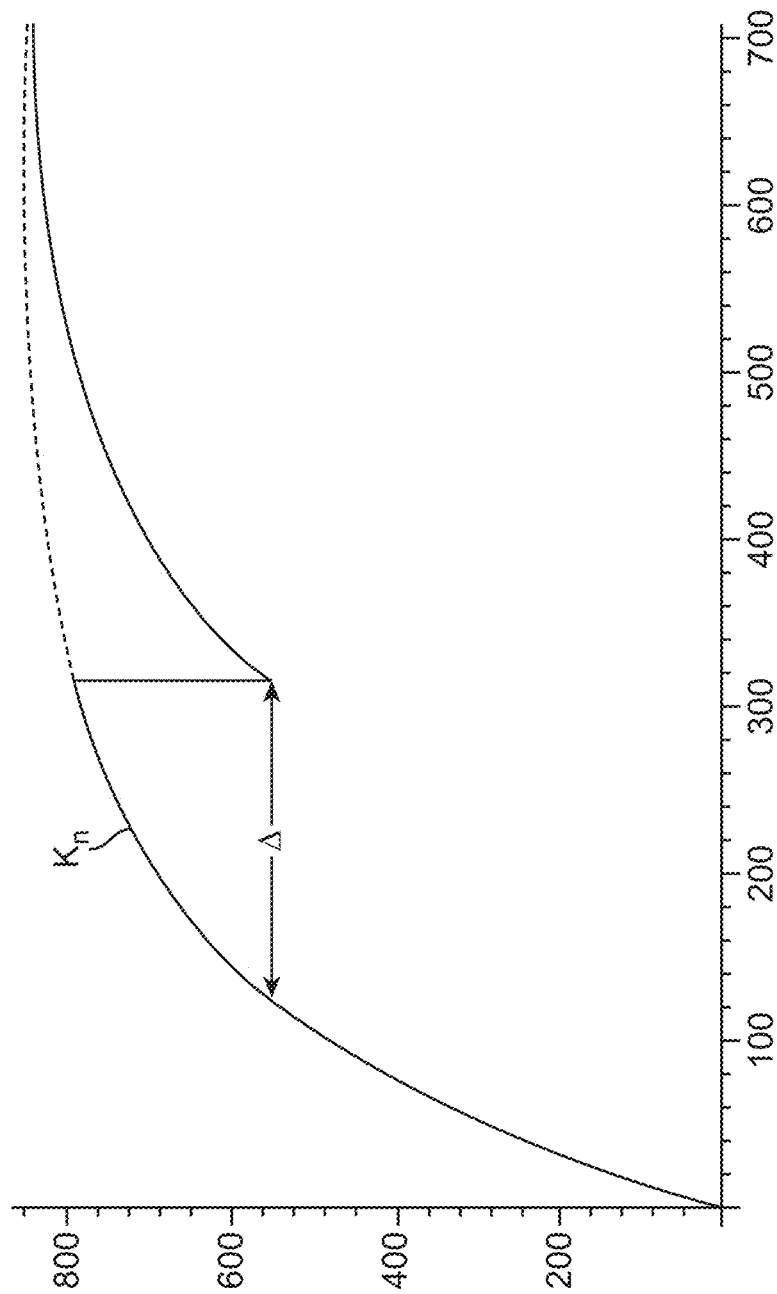
FIG. 12 illustrates an exemplary progression of the Kitu Score over time.

The progression of the Kitu Score in accordance with the above expression is illustrated in FIG. 12.

Incidents negatively affecting the Kitu Score for a device 102 can be of different types. For example, incidents may relate to: (i) loss of communications; (ii) missed data (metrology, control response); (iii) behavior violation (device is not operating within the parameters it is supposed to); (iv) security incidents. In one embodiment the length (duration) of each incident is recorded; specifically, the incident is characterized as having a start time (when the issue was detected) and an end time (when the issue was resolved).

The severity of an incident may be based on a combination of type and length. In one implementation four severity levels are defined: (i) Critical—device is offline or non-performing for a very long duration (over 48 hours); (ii) Major—device is offline or non-performing for a significant duration (over 24 hours); (iii) Minor I device if offline or non-performing (over 15 minutes or lower duration if device is coordinated with a utility server with shorter intervals); (iv) Warning—non impactful problem (shorter loss of communications, missed metrology data which can be retrieved later, slight deviation from defined operating parameters).

The penalty for a critical incident will typically be a loss of a large number of points in the Kitu Score for a device 102. The penalty for a major incident will generally be a loss of a significant number of points. The penalty for a minor incident is a loss of a few points. A warning, unless repeated, does not generally incur a loss of points.

A frequency penalty may also be applied. Additional points may be lost if a minimum of (i) m critical, (ii) n major, (iii) p minor incidents, or (iv) q warnings occur within 30 days of the occurrence of the first problem. The frequency penalty is generally reset after 30 days. For example, if a device had a major incident at date T0, it could incur a frequency penalty if it had q−1 more warnings between T0 and T0+30 days. A more serious incident always qualifies as an occurrence of lower severity for frequency penalty evaluation.

Device Onboarding

In one embodiment the platform 104 allows connection of any DER device 102 with a valid IEEE 2030.5 certificate. To establish a connection, the device installer or owner needs configure the device to point to the IP address of the platform 104 or to a fully qualified domain name (FQDN). The IEEE 2030.5 certificate may be used as the unique identifier for the device 102 by the IEEE 2030.5 server component 110. Two additional identification numbers are derived from this certificate (certificate fingerprints): the SFDI and the LFDI (short-form and long-form device identifier respectively)

The SFDI and LFDI are more convenient to use for various 'out-of-band' processes such as device provisioning. With 12 digits the SFDI can be used in most cases, but for large number of devices, there remains a probability of duplicates. The LFDI is composed of 40 hexadecimal digits.

Non-standard devices (e.g. using a proprietary protocol instead of IEEE 2030.5) can also be supported provided their aggregation platform can point to the platform 104, and there is an out-of-band process to match IEEE 2030.5 device identifiers (SFDI and LFDI) with proprietary device identifiers.

As soon as a device 102 establishes a connection (accepted certificate), the device 102 can be tested for its initial Kitu Score. The device's SFDI and LFDI are evaluated and the platform 104 will run its test suite. In order to retrieve the score for a device 102 and access the test results from the Web portal 112, the device owner 103 or installer utilizing a Kitu Scorecard application needs to provide an out-of-band way to match the device 102 with its SFDI/LFDI. The Scorecard application will prompt the user to provide the following information: Device Identifier; zip code information; utility information.

The Device Identifier can be the SFDI (if it's an IEEE 2030.5-capable device and the SFDI information is readily available, e.g. printed on the device's label), the LFDI (same as above), or another unique identifier (for example given by an aggregator) that the platform 104 can match with a SFDI/LFDI. The ZIP code information is a way to reduce the probability of duplicates (different devices may use the same SFDI) as well as to provide basic location information. The utility information field can also affect the device identification number (e.g. utilities may place a requirement on devices in their territory to use the LFDI for registration and other purposes). If the device information provided matches an existing user account (DER owner), then user authentication will be required prior to displaying any test results.

User Interface and Score Presentation

Users can access the Kitu Scorecard application on mobile or desktop platforms. For non-registered users, getting the Kitu Score should be an easy two-step process: 1)

configure the device to point the platform 104, 2) enter the device identification on the portal 112. In one implementation updates relating to the score evaluation are posted to a results page accessible through the portal 112. These updates may include: device information (SFDI, LFDI and other as available, e.g. device nameplate, make and model); connection information (IP address, latency); metrology data; response to test events. At the end of the test process, in one embodiment the score is presented on its scale from 0 to 850, where 300 marks the initial capability compliance.

Figure 4:
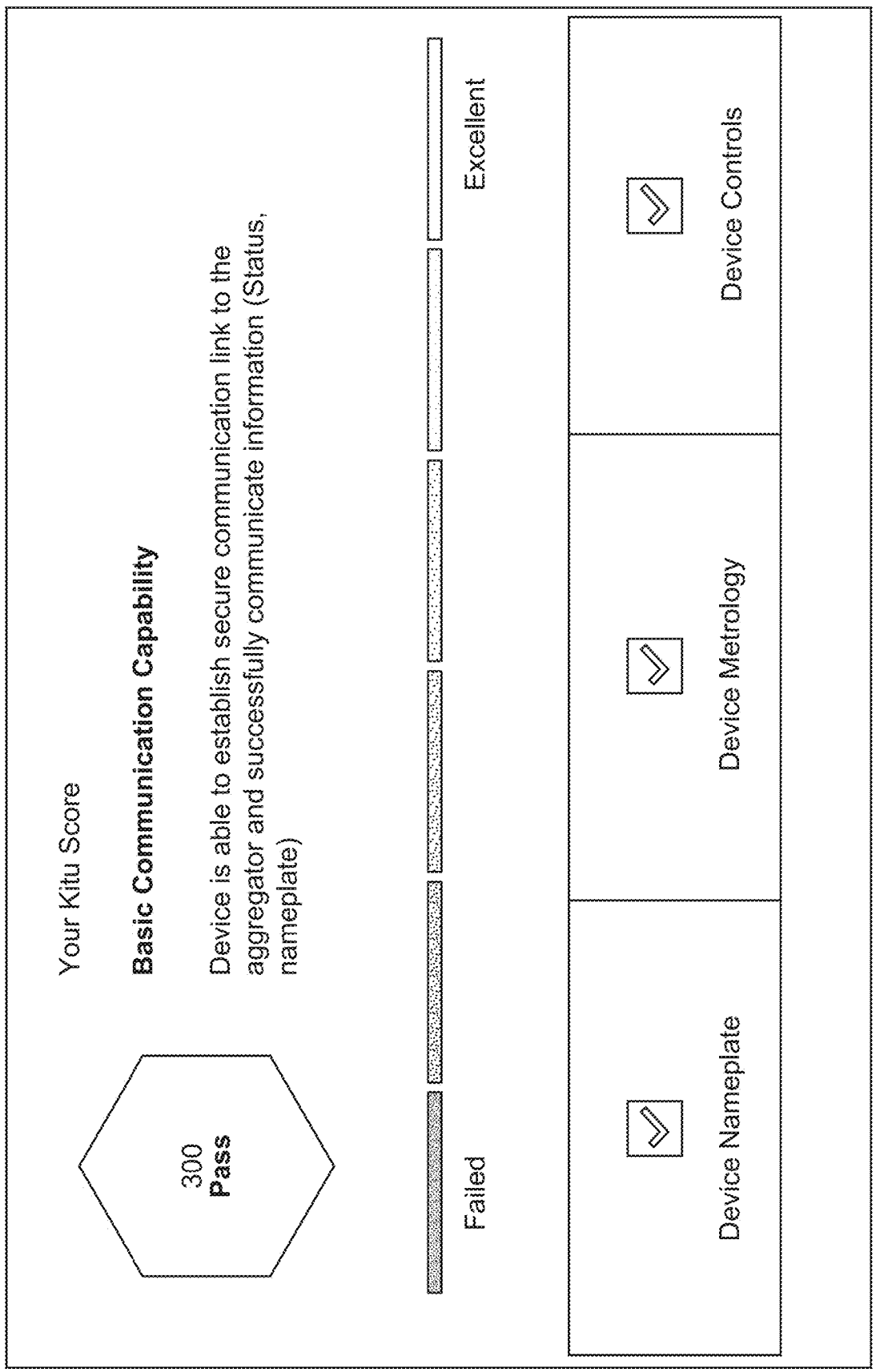
FIG. 4 is a screenshot of an exemplary user interface in which different colors are used to convey different results of a basic communication capability test performed as part of determining a Kitu Score.

FIG. 4 is a screenshot of a user interface provided through the portal 112 which illustrates the use of color coding to mark different scoring levels. As shown, the color red indicates a "Failed" testing status while the color blue indicates an "Excellent" testing status. The result page may also provide the percentage of devices 102 per score level. Score calculations may be run on a daily basis (unless manually triggered by a user).

The platform will go over the logs for each evaluated device 102 if an anomaly or incident affecting the score is detected. In this case the score receives the applicable penalty and the DER owner 103 and installer receive a notification (in the form of both an email and a message in the Web portal 112). If no anomaly or incident is detected, the device 102 stays on course to receive its weekly increase. At the end of the week, when such an increase is applied to the score a similar notification is sent. At the end of every calendar month a report is produced outlined any event or change in score that took placed in this month.

Figure 5:
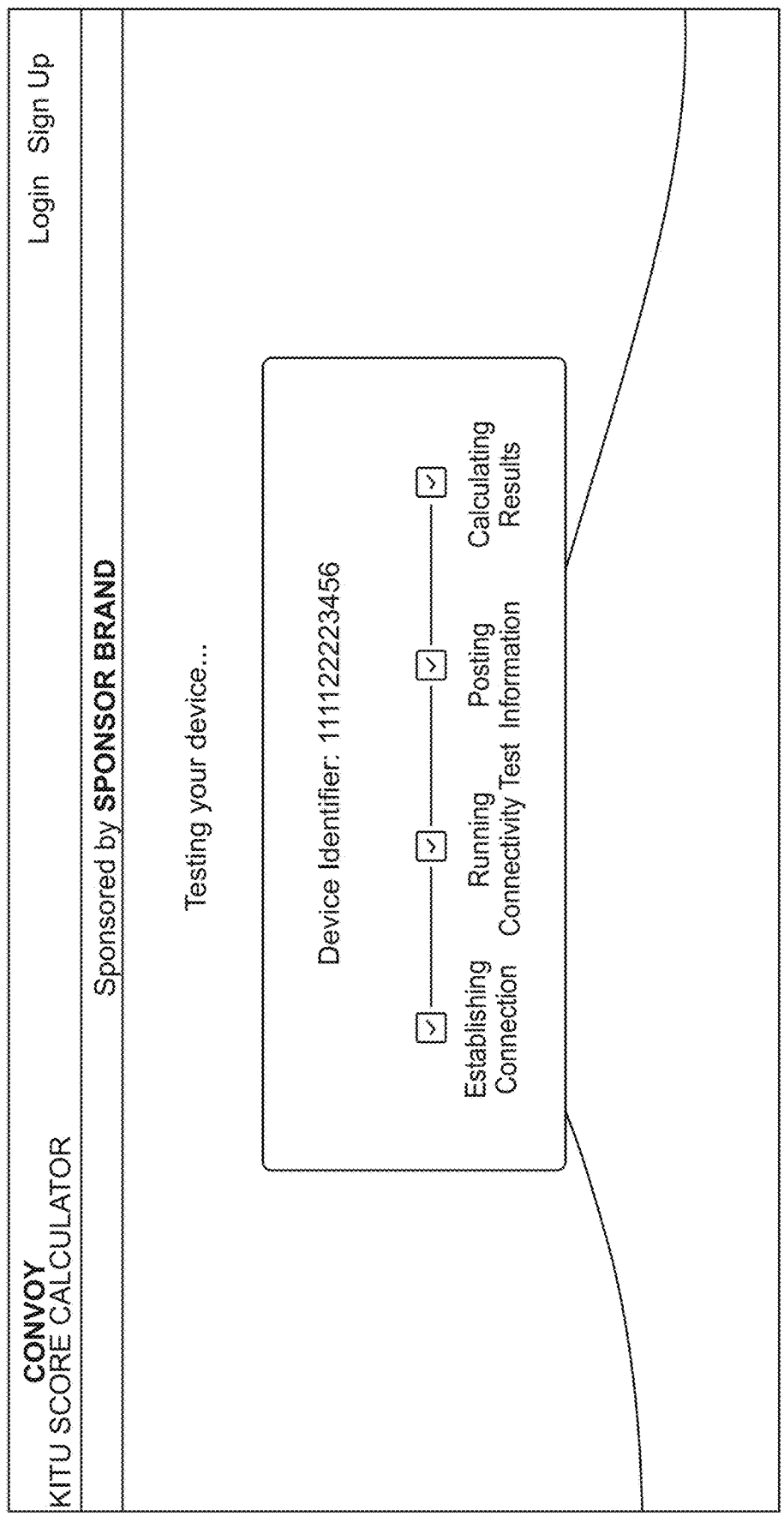
FIG. 5 is a screenshot of an exemplary user interface for an evaluation page which describes an exemplary set of steps of an evaluation of a DER.

It is recognized that DER owners 103 are often unaware of interconnection requirements, grid coordination and other related technical aspects associated with DER devices 102. It has been found that owners 103 tend to view DER devices 102 as reliable assets that provide direct value (as a means to save on energy bills, reduce taxes, obtain backup and/or independence) and do not require ongoing attention. Upon requesting a Kitu Score evaluation from the front page (after providing device identifier, ZIP code, and utility) the user interface provided by the portal 112 may shift to an evaluation page which describes the steps of the evaluation. See FIG. 5, in which a checkmark indicates the successful completion of a test phase.

In one embodiment each phase has a timeout. If the device 102 cannot be found (unable to establish communication with the device), the test procedure is interrupted and the user is prompted to verify connection parameters. If a subsequent test fails, it is marked as failed (red checkmark) but the evaluation continues (a device could fail to post metrology but respond to a control). At the end of the evaluation, the test and evaluation results are displayed through the user interface provided by the portal 112. See FIG. 6.

FIGS. 7-10 are flow diagrams illustrating a set of exemplary tests that could be executed to assess DER performance and availability in accordance with the disclosure. More specifically, FIGS. 7-10 are flow diagrams respectfully representative of connectivity, metrology/meter data, metrology/DER info and controls tests which may be executed in determining a Kitu Score for a DER device 102 under evaluation. As shown, the flow diagrams of FIGS. 7-10 include descriptions of IEEE 2030.5 and other messages sent by the DER service platform 104 and responses from the DER. The manner in which the results of these tests influence the determination of a Kitu Score is also described.

Figure 11:
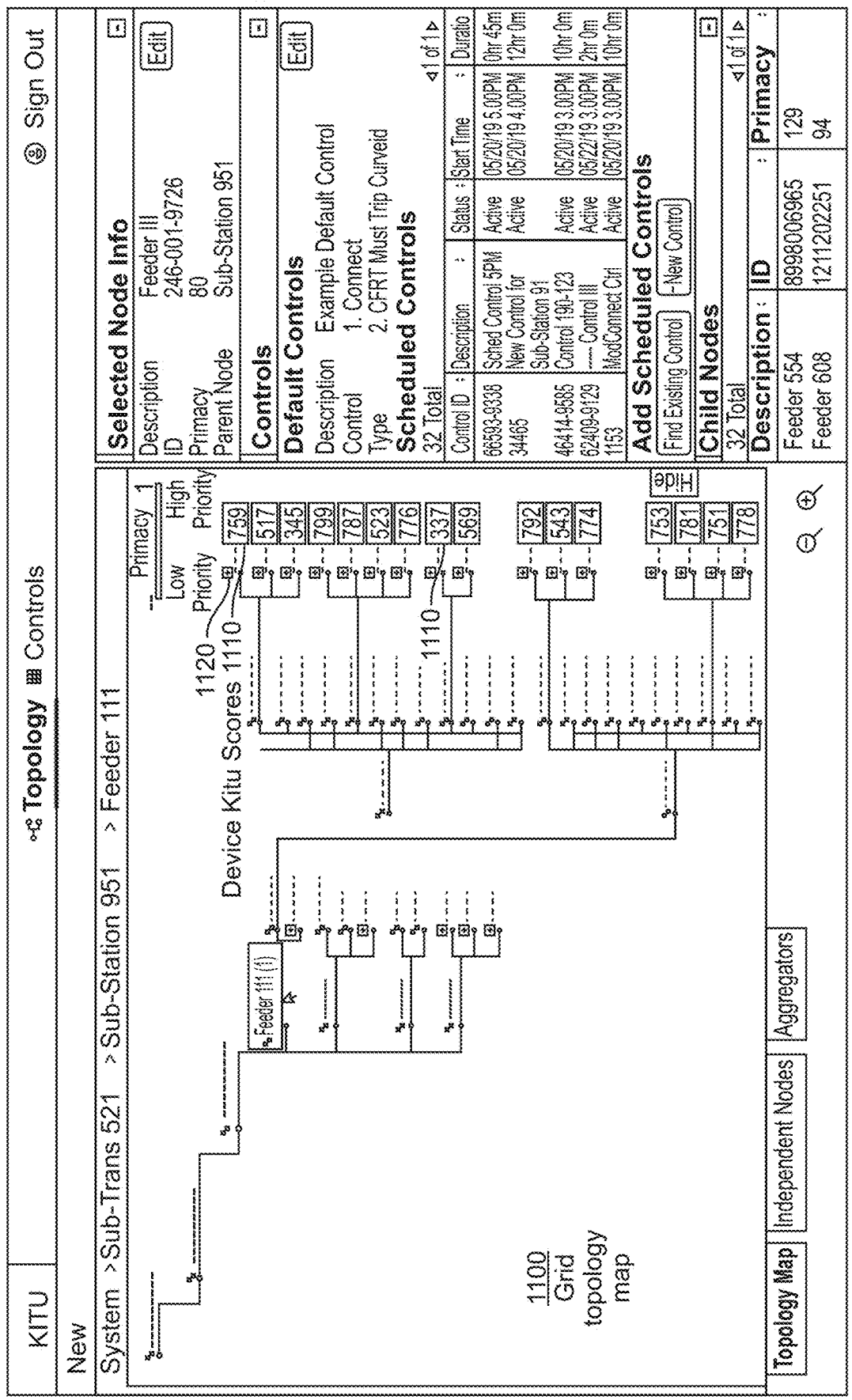
FIG. 11 illustratively illustrates a user interface provided by a Web portal 1 which includes a grid topology map and Kitu Scores associated with DER devices represented within the topology illustrated by the map.

FIG. 11 illustratively illustrates a user interface provided by the portal 112 which includes a grid topology map 1100 and Kitu Scores 1110 associated with DER devices 1120 represented within the topology illustrated by the map 1100. It may be appreciated that all DER devices 1120 within a given topology are of equivalent value. For example, the value of a DER device to the grid depends may depend on multiple factors such as nameplate or location in the topology (for example of 10 kW device located on a subfeeder with known voltage or capacity issues might be more important to the network operation than a device with 10× the nameplate located where no voltage or capacity constraint exist). The Kitu Score is a standard way to weigh the value of DER devices based on their reliability. For example, a DER device may have a big nameplate but be unavailable every time circumstances call for a control event, and therefore be less valuable to the grid. From the perspective of a utility, a device value might be measured as: $V = K \times Nameplate \times Location$ index While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors. Accordingly, the specification is intended to embrace all such modifications and variations of the disclosed embodiments that fall within the spirit and scope of the appended claims.

The various methods or processes outlined herein may be coded as software that is executable on one or more processors that employ any one of a variety of operating systems or platforms. Additionally, such software may be written using any of a number of suitable programming languages and/or programming or scripting tools, and may be compiled as executable machine language code or intermediate code that is executed on a framework or virtual machine.

In this respect, various inventive concepts may be embodied as a non-transitory computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The non-transitory computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

In addition, data structures may be stored in non-transitory computer-readable media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish a relationship between information in fields of a data structure, including through the use of pointers, tags or other mechanisms that establish relationship between data elements.

In addition, various inventive concepts may be embodied as one or more methods, of which an example has been provided. The acts performed as part of the method may be ordered in any suitable way. Accordingly, embodiments may be constructed in which acts are performed in an order different from illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for assessing reliability and availability of a distributed energy resource (DER) device included among a plurality of DER devices connected to a platform over a network, the method comprising:
   monitoring, by the platform, behavior of the DER device during a test period occurring upon establishment of a network connection with the DER device wherein the monitoring includes:
      sending control commands to the DER device during the test period;
      monitoring, based upon responses to the control commands sent by the DER device, an extent to which the DER device is available to engage in communication with the platform over the established network connection;
      determining whether the DER device acknowledges, over the established network connection, the control commands sent to the DER device over the established network connection;
      determining, based upon data relating to operation of the DER device sent by the DER device, whether the DER executes the control commands in conformance with at least one of a standard and a regulation; and
   determining, based upon the monitoring of the behavior of the DER device, a value of a reliability and availability score for the DER device.

2. The method of claim 1 further including determining an updated value of the reliability and availability score based upon subsequent monitoring of the behavior of the DER device.

3. The method of claim 1 wherein the monitoring includes determining whether the DER device regularly sends, over the established network connection, metrology data collected by the DER device wherein the metrology data includes measurement data relating to the operation of the DER device.

4. The method of claim 1 further including:
detecting an incident involving the DER device wherein the incident relates to failure of the DER device to operate in accordance with expected operating parameters while connected to the platform over the established network connection;
determining an updated value of the reliability and availability score based upon the incident.

5. The method of claim 4 wherein the incident relates to at least one of: a loss of the established network connection, a failure by the DER device to report data, a failure by the DER device to respond to one or more additional control commands sent to the DER device, reporting by the DER device of behavior of the DER device outside of a normal operating range.

6. The method of claim 4 wherein the incident is of a duration and a frequency over a measurement period and wherein the updated value of the reliability and availability score is based at least in part upon the duration and the frequency.

7. The method of claim 4 wherein the incident is of a severity and wherein the updated value of the reliability and availability score is based at least in part upon the severity of the incident.

8. The method of claim 1 further including determining an initial value of the reliability and availability score for the DER device based upon whether the DER device is determined to be compliant with grid interconnection requirements, the determining an initial value including determining whether the DER device sends metrology data conforming to the grid interconnection requirements.

9. A distributed energy resource (DER) service platform, the DER service platform comprising:
a DER management server connected to a plurality of DER devices over a network, the DER management server including one or more processors and code executable by the one or more processors for monitoring behavior of a DER device included among the plurality of DER devices during a test period occurring upon establishment of a network connection with the DER device wherein the code for monitoring the behavior of the DER device includes:
code for sending control commands to the DER device during the test period;
code for monitoring, based upon responses to the control commands sent by the DER device, an extent to which the DER device is available to engage in communication with the DER management server over the established network connection;
code for determining whether the DER device acknowledges, over the established network connection, control commands sent to the DER device over the network;
code for determining, based upon data relating to operation of the DER device sent by the DER device, whether the DER executes the control commands in conformance with at least one of a standard and a regulation;
a DER database including monitoring information concerning results of the monitoring the behavior of the DER device; and
a DER device scoring engine including at least one processor and code executable by the at least one processor for calculating a value of a reliability and availability score for the DER device based upon the monitoring information.

10. The DER service platform of claim 9 wherein the code for calculating further includes code for calculating an updated value of the reliability and availability score based upon subsequent monitoring of the behavior of the DER device.

11. The DER service platform of claim 9 wherein the code for monitoring further includes code for determining whether the DER device regularly sends, over the network, metrology data collected by DER device wherein the metrology data includes measurement data relating to operation of the DER device.

12. The DER service platform of claim 9 wherein the code for monitoring further includes code for detecting an incident involving the DER device wherein the incident relates to failure of the DER device to operate in accordance with expected operating parameters while connected to the DER management server over the established network connection, the code for calculating further including code for determining an updated value of the reliability and availability score based upon the incident.

13. The DER service platform of claim 12 wherein the incident relates to at least one of: a loss of a network connection with the DER device, a failure by the DER device to report data, a failure by the DER device to respond to one or more additional control commands sent to the DER device, reporting by the DER device of behavior of the DER device outside of a normal operating range.

14. The DER service platform of claim 12 wherein the incident is of a duration and a frequency over a measurement period and wherein the updated value of the reliability and availability score is based at least in part upon the duration and the frequency.

15. The DER service platform of claim 12 wherein the incident is of a severity and wherein the updated value of the reliability and availability score is based at least in part upon the severity of the incident.

16. The DER service platform of claim 9 further including code for determining an initial value of the reliability and availability score for the DER device based upon whether the DER device is determined to be compliant with interconnection requirements.

* * * * *